L. H. KEIM.
TRACTOR TRANSMISSION MECHANISM.
APPLICATION FILED FEB. 1, 1918.
1,431,959.
Patented Oct. 17, 1922.
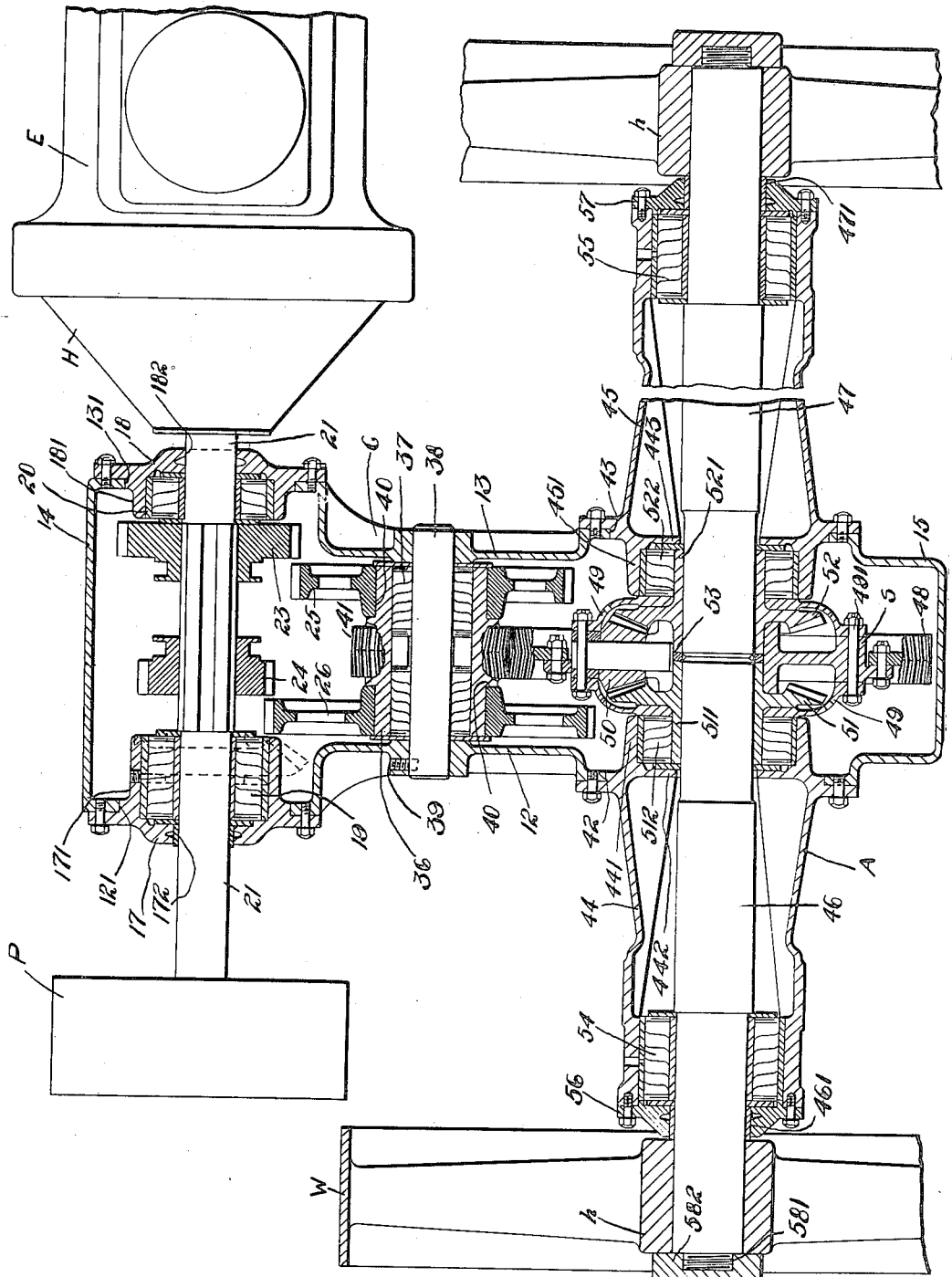
WITNESSES:
J. T. Wurmb.
E. L. Greenewald.
INVENTOR
Lester H. Keim
BY
Wesley G. Carr
ATTORNEY Patented Oct. 17, 1922.

1,431,959

UNITED STATES PATENT OFFICE.

LESTER H. KEIM, OF CHICAGO, ILLINOIS, ASSIGNOR TO R. D. NUTTALL COMPANY, A CORPORATION OF PENNSYLVANIA.

TRACTOR TRANSMISSION MECHANISM.

Application filed February 1, 1918. Serial No. 214,811.

*To all whom it may concern:*

Be it known that I, LESTER H. KEIM, a citizen of the United States, and a resident of Chicago, in the county of Cook and State of Illinois, have invented a new and useful Improvement in Tractor Transmission Mechanisms, of which the following is a specification.

This invention relates to transmission mechanisms particularly adapted for heavy-duty vehicles, such as tractors and trucks, but it is to be understood that certain features may be embodied in other motor-driven vehicles.

The principal object of the present invention is to provide a compact, rugged transmission mechanism in which the change-speed mechanism, reversing mechanism and differential are completely enclosed within a dust-excluding casing adapted to contain lubricating oil.

Another object of the invention is to provide a transmission mechanism of this class in which the differential mechanism is directly connected, by suitable shafting, to the hubs of the tractor wheels to obtain what is commonly known as a "live-axle" drive.

Another object of the invention is to provide a well balanced change-speed and transmission unit in which the driving shaft projects from opposite sides of the transmission casing for connection, at one end, to a pulley and at the other end to an internal-combustion engine.

Another object of the invention is to provide a reduction gearing of as large a ratio as possible, and to accomplish this I employ helical gearing for transmitting the power from the counter-shaft to the driven axles.

The above and other objects and the novel features of my invention will be apparent from the foregoing description taken in connection with the drawing constituting a part of this application and in which the single figure is a horizontal sectional view of a transmission mechanism embodying my invention.

The invention is shown as designed for embodiment in a gas-engine-driven farm tractor, but it is to be understood that certain features thereof are not limited to this application but may be applied to other types of transmission mechanisms and vehicles. A transmission casing C, that encloses the change-speed and the differential mechanism is supported at its rear end by an axle A and traction wheels W.

The casing C is substantially rectangular and trough-shaped and has parallel side walls 12 and 13, end walls 14 and 15 and a bottom wall 16 which latter merges into the end walls 14 and 15. The side walls 12 and 13 have two oppositely disposed openings 121 and 131 therein, at the front end of the casing, to receive the bearing caps 17 and 18, which are bolted to portions of the walls 12 and 13 surrounding the openings and formed with inwardly extending flanges 171 and 181 that support the bearings 19 and 20 upon which the driving shaft 21 is mounted. The driving shaft 21 extends transversely through the casing and projects through the openings 172 and 182 in the caps 17 and 18. An internal-combustion engine E is mounted upon a vehicle frame (not shown), and has its shaft extending transversely of the longitudinal center line of the vehicle, the engine transmission shaft being connected to the driving shaft 21 through a suitable clutch and other parts (not shown) enclosed within a housing H. The end of the driving shaft 21 that projects from the other side of the transmission case C has a pulley P mounted thereon which is adapted to be belted to farm machinery when the vehicle is stationary.

The high-speed pinion 23 and the low-speed pinion 24 are splined on the driving shaft 21 within the casing C and are movable axially of the driving shaft into, and out of, mesh with the high and low-speed gears 25 and 26 respectively. The pinions 23, 24 are provided with grooved collars to receive the lower forked ends of shifters (not shown).

The high and low-speed gears 25 and 26 have hollow hubs surrounding the ends of a sleeve 36 that is rotatably supported on bearings 37 which are mounted on a counter-shaft 38. The ends of the shaft 38 fit in openings in the side walls of the casing C and the shaft is held stationary by means of a set screw 39. The length of the sleeve 36 is slightly less than the distance between the side walls 12 and 13, a small clearance being allowed at each end. At opposite sides of its center, the sleeve is provided with shoulders 40 against which the hubs of the gears 25 and 26 abut. The central part of the sleeve is enlarged and provided with double-helical teeth to form a pinion 41 that is integral with the sleeve and will rotate with the gears 25 and 26.

Near its rear end, the casing C is provided with two oppositely disposed openings 42 and 43 to receive portions of the sleeves 44 and 45 that surround the driving axles 46 and 47 and carry the bearings therefor. The pinion 41 is constantly enmeshed with a suitable external double-helical gear 48 that is bolted by bolts 491 to the rim of a differential spider S and to the differential side plates 49. The differential side plates also enclose rotatable differential bevel pinions 50 that are carried by the spider S and mesh with the two differential bevel gears 51 and 52 located at opposite sides of the differential spider S. The bevel gears 51 and 52 are provided with elongated cylindrical hubs 511 and 521 that surround, and are keyed to, the driving axles 46 and 47, respectively. The hubs 511 and 521 are respectively supported by bearings 512 and 522 carried, respectively, by the flanges 441 and 451 at the inner ends of the sleeves 44 and 45, and longitudinal movement of the differential housing, bearings 512 and 522 and the hubs 511 and 521 is limited by the flanges 442 and 443 that extend inwardly, at right angles, toward the axles from the bases of the flanges 441 and 451. A spacer ring 53 is disposed between the inner ends of the axles 46 and 47 and the inner ends of the hubs 511 and 521. The inner ends of the sleeve 44 and 45 are bolted to the casing C, and the outer ends thereof are secured to the side members of the frame F and enclose bearings 54 and 55 that carry the axles 46 and 47. Caps 56 and 57 are bolted to the ends of the sleeves 44 and 45 and are provided with central openings through which the axles 46 and 47 project. The outer ends of the axles 46 and 47 project into the hollow hubs $h$ of the tractor wheels W and are rigidly keyed thereto. The axles 46 and 47 have reduced threaded ends 581 to receive the hub caps 582 which overlap the ends of the axles and the portions of the hubs $h$ and hold the wheels W against the ends of the sleeves 461 and 471.

The operation of the speed-change transmission mechanism will be apparent from the foregoing description. The low-speed pinion 24 is adapted to be moved into mesh with the low-speed gear 26, or the high-speed pinion 24 may be enmeshed with the high-speed gear 25, either of which will drive the pinion sleeve 36 carrying the pinion 41 so as to propel the vehicle in a forward direction. The speed-change transmission is thus capable of adjustment to two speeds forward.

The pinion 41 and the differential gear 48 are symmetrically located with respect to the longitudinal central plane of the vehicle end of the transmission case C to provide a more rugged construction and to prevent distortion in the casing C and in the differential housing. The double-helical teeth on the pinion 41 and gear 48 equalize the end thrusts on the elements associated therewith. I obtain a symmetrical construction, a maximum speed reduction, strength and efficiency at a minimum expense by using a helical pinion-and-gear reduction gearing between the driving shaft and rear drive axles. This is because I may employ a helical pinion of a finer pitch, less diameter and less width of face, without reducing the strength of the pinion and its teeth below that of the lowest possible size of spur pinion for transmitting the same power. Furthermore, with a given number of teeth on the driving pinion, the helical gear mating therewith may have more teeth than the gear of a spur pinion-and-gear drive, which also results in a greater speed reduction. In this construction, the faces of the gear and pinion may be narrower than the faces of a spur gear and pinion for the same purpose, thus effecting a saving in the weight of the gearing.

While I have shown and described the construction and arrangement in detail, it will be apparent that various changes may be made without departing from my invention, as expressed in the appended claims.

I claim as my invention:

1. In combination, in a transmission mechanism, a gear casing having a plurality of pairs of oppositely disposed openings in its side walls, a driving shaft journalled in a pair of said openings, a driven shaft journalled in another pair of said openings, speed-changing and reversing gears carried by said shafts, a differential mechanism operatively connected to a pinion on said driven shaft and having the driven gear wheels thereof provided with extended hub portions, a pair of oppositely extending axle members extending through the walls of the casing, road wheels secured to the axle members, sleeves surrounding said axle members and provided with axle-bearing supports, means for supporting the differential mechanism directly upon the said axle-bearing supports, and means whereby the sleeves are secured to the casing, and a differential-gear housing superposed upon the said hub portions.

2. In combination, in a transmission mechanism, a gear casing, a transmission mechanism mounted in the casing, a driving member, a differential mechanism operatively connected to said transmission mechanism and having the driven gear wheels thereof provided with extended hub portions, a pair of oppositely-extending sleeve members secured to the casing, a pair of oppositely-disposed axle members extending into the sleeve members and operatively connected to the differential mechanism, axle-bearing supports carried within the sleeve members and serving also as bearings for the said hub portions, and a road wheel connected to each of the axle members at its outer end.

3. In combination, in a transmission mechanism, a gear casing, a transmission mechanism secured therein, means for driving the transmission mechanism, a differential mechanism also carried within the casing and having the driven gear wheels thereof provided with extended hub portions, a pair of oppositely-disposed sleeve members secured to the casing, a bearing on the inner end of each sleeve member by which the differential mechanism is directly supported, through said hubs a pair of axle members extending into the sleeve members and each having its inner end oppositely connected to the differential mechanism and supported adjacent its outer end in a bearing carried within its associated sleeve member, and a road wheel secured to the outer end of each axle member.

4. In combination, in a transmission mechanism, a gear case provided with a plurality of openings in its side walls, a driving shaft, a differential mechanism operatively connected to the driving shaft and comprising beveled pinions and gear wheels, a pair of oppositely extending axle members extending through the walls of the casing, and sleeves surrounding the axle members and provided with supports for the inner ends of the axles, the differential gear wheels having extended hub portions and the said supports serving also as bearings for the said hub portions.

5. In combination, in a transmission mechanism, a gear case provided with a plurality of openings in its side walls, a driving shaft, a differential mechanism operatively connected to the driving shaft and having its driven gear wheels formed with extended hub portions, a pair of oppositely extending axle members extending through the walls of the casing, and sleeves surrounding the axle members and provided with bearings for the said extended hub portions.

In testimony whereof, I have hereunto subscribed my name this 15th day of Jan., 1918.

LESTER H. KEIM.